US012159384B2

United States Patent
Song et al.

(10) Patent No.: US 12,159,384 B2
(45) Date of Patent: Dec. 3, 2024

(54) ROBUST ROADWAY CRACK SEGMENTATION USING ENCODER-DECODER NETWORKS WITH RANGE IMAGES

(71) Applicant: THE BOARD OF TRUSTEES OF THE UNIVERSITY OF ALABAMA, Tuscaloosa, AL (US)

(72) Inventors: Wei Song, Tuscaloosa, AL (US); Shanglian Zhou, Tuscaloosa, AL (US)

(73) Assignee: THE BOARD OF TRUSTEES OF THE UNIVERSITY OF ALABAMA, Tuscaloosa, AL (US)

( * ) Notice: Subject to any disclaimer, the term of this patent is extended or adjusted under 35 U.S.C. 154(b) by 326 days.

(21) Appl. No.: 17/313,070

(22) Filed: May 6, 2021

(65) Prior Publication Data

US 2021/0350517 A1   Nov. 11, 2021

Related U.S. Application Data

(60) Provisional application No. 63/021,916, filed on May 8, 2020.

(51) Int. Cl.
*G06T 7/00* (2017.01)
*G06F 18/214* (2023.01)
(Continued)

(52) U.S. Cl.
CPC .......... *G06T 7/0002* (2013.01); *G06F 18/214* (2023.01); *G06N 3/045* (2023.01);
(Continued)

(58) Field of Classification Search
CPC ................ G06T 7/0002; G06T 7/11; G06T 2207/20081; G06T 2207/20084;
(Continued)

(56) References Cited

U.S. PATENT DOCUMENTS 9,551,616 B2    1/2017  McQuilkin et al.
11,042,742 B1 *  6/2021  Yang ................... G06T 7/11
(Continued)

FOREIGN PATENT DOCUMENTS

CN   108921846 A   11/2018
WO   2018165753   9/2018

OTHER PUBLICATIONS

Q. Zou, Z. Zhang, Q. Li, X. Qi, Q. Wang and S. Wang, "DeepCrack: Learning Hierarchical Convolutional Features for Crack Detection," in IEEE Transactions on Image Processing, vol. 28, No. 3, pp. 1498-1512, Mar. 2019, doi: 10.1109/TIP.2018.2878966.*
(Continued)

*Primary Examiner* — Oneal R Mistry
*Assistant Examiner* — Jongbong Nah
(74) *Attorney, Agent, or Firm* — Meunier Carlin & Curfman LLC

(57) ABSTRACT

In an implementation, a method for pixel level roadway crack segmentation is provided. The method includes: receiving a plurality of roadway range images; generating a plurality of image patches from the plurality of roadway range images; generating a crack map for the plurality of image patches by a DCNN; and generating a crack map for the plurality of roadway range images based on the generated crack map for the plurality of image patches.

8 Claims, 8 Drawing Sheets

(51) Int. Cl.
- *G06K 9/62* (2022.01)
- *G06N 3/04* (2023.01)
- *G06N 3/045* (2023.01)
- *G06N 3/08* (2023.01)
- *G06N 3/088* (2023.01)
- *G06T 7/11* (2017.01)
- *G06V 10/82* (2022.01)
- *G06V 20/56* (2022.01)

(52) U.S. Cl.
CPC ............... *G06N 3/088* (2013.01); *G06T 7/11* (2017.01); *G06V 10/82* (2022.01); *G06V 20/588* (2022.01); *G06T 2207/20081* (2013.01); *G06T 2207/20084* (2013.01); *G06T 2207/30184* (2013.01); *G06T 2207/30252* (2013.01)

(58) Field of Classification Search
CPC ........... G06T 2207/30184; G06T 2207/30252; G06V 10/82; G06V 20/588; G06F 18/214; G06N 3/045; G06N 3/088
See application file for complete search history.

(56) References Cited

U.S. PATENT DOCUMENTS

| | | | |
|---|---|---|---|
| 2013/0155061 | A1 | 6/2013 | Jahanshahi et al. |
| 2015/0347831 | A1* | 12/2015 | Tamatsu .............. H04N 5/144 348/148 |
| 2016/0292518 | A1* | 10/2016 | Banitt ................. G06V 20/56 |
| 2019/0154442 | A1* | 5/2019 | Annovi ................ G01C 7/04 |

OTHER PUBLICATIONS

V. Badrinarayanan, A. Kendall and R. Cipolla, "SegNet: A Deep Convolutional Encoder-Decoder Architecture for Image Segmentation," in IEEE Transactions on Pattern Analysis and Machine Intelligence, vol. 39, No. 12, pp. 2481-2495, Dec. 1, 2017, doi: 10.1109/TPAMI.2016.2644615.*

Bang, Seongdeok, et al. "Encoder-decoder network for pixel-level road crack detection in black-box images." Computer-Aided Civil and Infrastructure Engineering 34.8 (2019): 713-727. (Year: 2017).*

Chen, Hanshen, Huiping Lin, and Minghai Yao. "Improving the efficiency of encoder-decoder architecture for pixel-level crack detection." IEEE Access 7 (2019): 186657-186670. (Year: 2019).*

Zhang, Allen, et al. "Automated pixel-level pavement crack detection on 3D asphalt surfaces using a deep-learning network." Computer-Aided Civil and Infrastructure Engineering 32.10 (2017): 805-819. (Year: 2017).*

Cha, Young-Jin, Wooram Choi, and Oral Büyüköztürk. "Deep learning-based crack damage detection using convolutional neural networks." Computer-Aided Civil and Infrastructure Engineering 32.5 (2017): 361-378. (Year: 2017).*

Bang, Seongdeok, et al. "Encoder-decoder network for pixel-level road crack detection in black-box images." Computer-Aided Civil and Infrastructure Engineering 34.8 (2019): 713-727. (Year: 2019).*

Fei, Yue, et al. "Pixel-level cracking detection on 3D asphalt pavement images through deep-learning-based CrackNet-V." IEEE Transactions on Intelligent Transportation Systems 21.1 (2019): 273-284. (Year: 2019).*

Shao et al., Remote sensing image fusion with deep convolutional neural network, Mar. 2018, IEEE Journal of Selected Topics in Applied Earth Observations and Remote Sensing, vol. 11, 1656-1669 (Year: 2018).

Bang et al., Encoder-decoder network for pixel-level road crack detection in black-box images, Feb. 2019, Computer-Aided Civil and Infrastructure Engineering, vol. 34, 713-727 (Year: 2019).

Non-Final Office Action dated May 15, 2023 in U.S. Appl. No. 17/333,252.

* cited by examiner

ROBUST ROADWAY CRACK SEGMENTATION USING ENCODER-DECODER NETWORKS WITH RANGE IMAGES

CROSS-REFERENCE TO RELATED APPLICATIONS

This application claims priority to U.S. Provisional Application Ser. No. 63/021,916, filed on May 8, 2020, and entitled "ROBUST ROADWAY CRACK SEGMENTATION USING ENCODER-DECODER NETWORKS WITH RANGE IMAGES." The contents of which are hereby incorporated by reference in their entirety.

BACKGROUND

Recent years have witnessed a steady trend of growth in the transportation infrastructure investment. For example, according to the U.S. Census Bureau, the total construction spending on highway and street during March 2020 was estimated at a seasonally adjusted annual rate (SAAR) of 108.6 billion dollars, 4.5% higher than in February 2020 and 5.3% higher than in March 2019. Over a wider timespan, the SAAR of the construction spending on highway and street has steadily increased from 78.2 billion dollars in March 2010 to 108.6 billion dollars in March 2020, at an annualized growth rate of 3.3%. Alongside the vigorous development of the transportation infrastructure, there has been a rising demand for a more efficient investment on transportation infrastructure by facilitating performance-based decision-making and appropriately managing infrastructure assets for better stewardship of the transportation system.

Enacted since 2005, the Moving Ahead for Progress in the 21st Century Act (MAP-21) sets the course for transportation investment in highways to address many challenges facing the U.S. transportation system such as improving safety and maintaining infrastructure condition. One of the core concepts and requirements under MAP-21 is to establish performance-based planning and programming to promote an efficient transportation system and improve transportation decision-making. For the Federal Highway Administration (FHWA), State Department of Transportation (DOT), and local governments, long-term efforts need to be devoted to implementing performance management activities and methodologies, such that the requirements by the MAP-21 are fulfilled.

Right-of-way (ROW) imagery has become one of the data sources submitted to both the Transportation Asset Management Plans (TAMP) mandated by MAP-21 and the Highway Performance Monitoring System (HPMS). By using image data taken from a ROW imaging system (e.g., a survey vehicle), image-based methodologies with advanced computer vision techniques for roadway defects detection can offer an efficient performance-based framework to facilitate the condition assessment and decision-making process for transportation infrastructure. Thus, it has been a rising interest for professionals and researchers to develop more efficient and accurate image-based methodologies on roadway defects detection for the purpose of promoting social welfare and stimulating economy through improving the transportation system.

SUMMARY

In an implementation, a method for pixel level roadway crack segmentation is provided. The method includes: receiving a plurality of roadway range images; generating a plurality of image patches from the plurality of roadway range images; generating a crack map for the plurality of image patches by a DCNN; and generating a crack map for the plurality of roadway range images based on the generated crack map for the plurality of image patches.

In an implementation, a method for pixel level roadway crack segmentation is provided. The method includes: receiving a first plurality of roadway range images by a imaging system; generating a first plurality of image patches from the first plurality of roadway range images by a computing device; for each image patch of the first plurality of image patches that includes a crack, generating a ground truth label for the image patch; and training a deep convolutional neural network (DCNN) using the labeled images patches by the computing device.

Implementations may include some or all of the following features. The roadway range images may be 3D images. The method may further include: receiving a second plurality of roadway range images; generating a second plurality of image patches from the second plurality of roadway range images; generating a crack map for the second plurality of image patches by the DCNN; and generating a crack map for the second plurality of roadway images based on the generated crack map for the second plurality of image patches. The image patches may be generated using a sliding window process. The DCNN may include a plurality of hidden layers. The DCNN may be an encoder-decoder network. The encoder-decoder may include an encoder and a decoder. The encoder may include a plurality of convolutional block for each extracted feature. Each convolutional block may include a 2×2 max pooling layer with stride of 2 for down sampling, a 3×3 convolutional layer which adopts 3×3 kernels with a stride of 1 and padding of 1 for feature extraction, a batch normalization layer to improve model generation, and a leaky rectified linear unit layer to add non-linearity. The decoder may include a plurality of transposed convolutional blocks. Each transposed convolutional blocks may include: a 3×3 transposed convolutional layer utilizing 3×3 kernels with a stride of 2 and a cropping of 1; and a batch normalization and leaky ReLU layer. The DCNN may include a depth of between 6 and 16. The DCNN may include between 1 and 6 residual connections.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

1. Introduction

Figure 1:
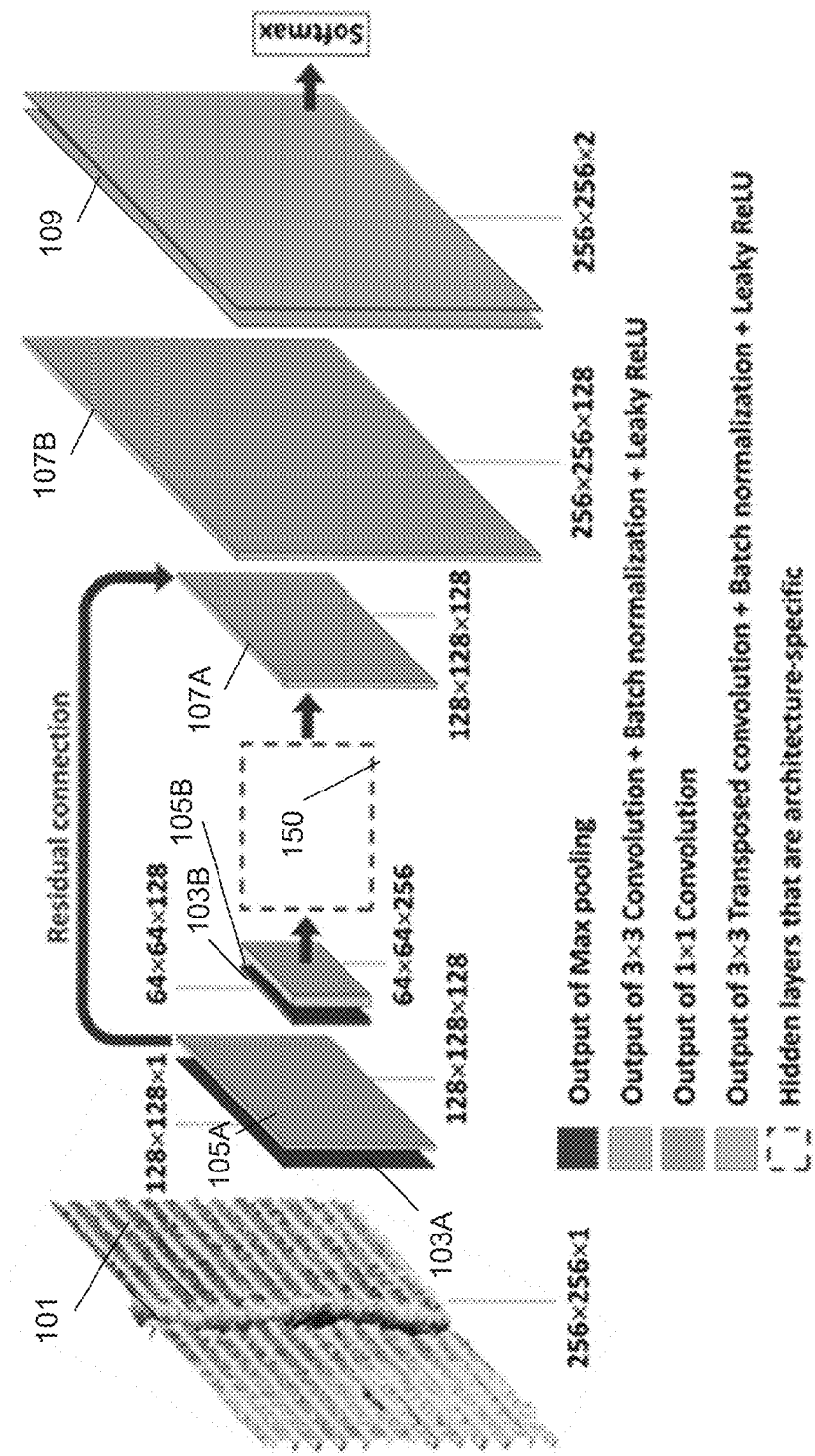
FIG. 1 is an illustration of a proposed DCNN architecture for semantic segmentation.

Cracking is one of the most common defects in civil infrastructure. Depending on their severity levels, structural cracks can reduce the serviceability of a civil structure, causing structural damages, and thus threatening the structural integrity and even human lives. It has been a strong demand and interest for professionals and researchers to develop efficient crack detection techniques to facilitate a prompt structural health monitoring (SHM) and rehabilitation process. In recent decades, image-based crack detection methodologies have been extensively developed and applied. Compared against some traditional manual approaches such as visual inspection, which are usually subjective and labor-intensive, image-based methodologies offer an automated yet more consistent and objective alternative that can reduce labor cost and improve crack detection efficiency.

From the perspective of feature representation and classification, current image-based methods can be categorized into non-learning-based and learning-based methods. Most of early image-based methods belong to the non-learning-based category. This type of methodology usually employs handcrafted image processing techniques such as filtering, thresholding, and morphological operation, for crack enhancement and cracking feature extraction. Although certain successes were reported in these applications, the non-learning-based methods usually require prior user input or subjective parameter selection. Thus, their applicability under real-world scenarios is usually limited, due to the subjectivity of human intervention and the lack of ability to self-adapt to variations of the environment.

Learning-based methods can potentially alleviate the above subjectivities by directly learning from data, making predictions via self-learned pattern recognition and extraction. In literature, some common machine learning methods such as k-nearest neighbors (k-NN), support vector machine (SVM), and neural network (NN), have been explored by researchers for crack classification. While these studies represent the pioneering machine learning applications on crack detection, they generally represent few layers of feature abstraction and hence cannot fully reflect the real-world complexity.

As computer algorithms and high-performance computing devices rapidly evolve in recent years, deep convolutional neural network (DCNN), a type of deep learning-based methods, has been extensively explored for crack detection tasks. Compared with regular machine learning methods, DCNN has the advantage of achieving multi-level feature abstraction through a deep architecture layout, and thus enabling the ability of self-adaptation and adjustment to reflect a highly complex model. DCNN shares a similarity with the cerebral cortex, where the hierarchical organization of the layers (and the neurons) in a DCNN resembles the connectivity pattern of the neurons in the cortex to enable multi-level feature abstraction. Many recent DCNN-based applications for crack classification were reported in literature. While certain levels of successes were reported, these methodologies detect cracks by image patches, thus the extracted cracking information has a limited resolution.

Most recent developments in DCNN are focused on pixel-wise crack classification through semantic segmentation, which is a process to segment an image into different regions by associating each pixel with a categorical label. An encoder-decoder network is a type of semantic DCNN which has gained many researchers' interests. The encoder-decoder network contains two essential components: an encoder network to extract features from the input image, and a decoder network to expand the extracted features to match the size of the output and input. However, as these aforementioned DCNN applications only used intensity images for training, their performance may potentially deteriorate due to disturbances in image intensity data such as shadows, uneven lighting condition, oil spills and blemishes.

2. Technical Overview

This section briefly introduces the technical background related with the proposed systems and methods, including the encoder-decoder network and residual connection.

2.1 Encoder-Decoder Network

The encoder-decoder network is a popular form of semantic neural networks for image segmentation tasks. In an encoder-decoder network, the role of the encoder is to perform feature extractions on the input images, and the role of the decoder is to expand the features extracted through the encoder such that the size of the output probability map matches with that of the input image.

The described systems and methods include encoder-decoder networks for roadway crack segmentation. The network layers involved in the proposed networks include convolutional layers, transposed convolutional layers, and auxiliary layers such as max pooling, batch normalization, nonlinear activation, and softmax layers. Any technique for generating network layers may be used.

2.2. Residual Connection

In DCNN-related studies, an intuitive strategy to improve the network performance is to increase the model capacity by stacking more layers. However, increasing the network depth does not always result in improved performance; the deeper architecture might not outperform its shallower counterpart due to performance degradation brought by considerably increased network depth. To alleviate such issues in deep architectures, the concept of residual connection (also known as skip connection) may be used. The residual connection can improve the network performance by integrating the hierarchical features from different layers through a shortcut connection, which facilitates the training process. Also, the use of residual connections in deep architectures can alleviate the issues of singularities in models which slow down the learning process and lead to performance degradation.

In some embodiments, residual connections between the encoder and decoder are established, where the hierarchical features are integrated through an arithmetic addition operation. The impacts of residual connections on crack segmentation performance of DCNNs using laser-scanned roadway images, which has not been thoroughly investigated in literature, are demonstrated, and evaluated at Case I of this document.

2.3 Performance Metrics

Three metrics including F1, intersection over union, and boundary F1 score are employed to provide a thorough evaluation on the segmentation performance of each architecture embodiment. The details of each type of metrics are briefly described in the subsequent sections.

2.3.1. Precision-Recall Analysis

In binary segmentation, the number of foreground objects is usually much fewer than that of background, which is referred to as the class imbalance issue. In the case of crack segmentation, the ratio between the total number of foreground (i.e., crack) and background (i.e., non-crack) pixels in this study is around 1:30. One of the most straightforward and commonly used metrics, accuracy, has very poor performance on a class-imbalanced dataset. Accuracy is defined as the number of correctly identified pixels over all predicted pixels. Given an image where the majority belongs to the non-crack class, for example, 90%, the accuracy value may still be as high as 90% even if all the pixels are predicted as non-crack ones and none of the true crack pixels is correctly identified. Therefore, the adopted metrics may need to be able to address the issue due to class imbalance.

The precision-recall analysis may be used as one of the performance measures. Three metrics including precision, recall, and F1 score (also known as F-measure) may be used. As expressed in equation 1A, precision is defined as the ratio of correctly predicted crack pixels with respect to all the pixels predicted as cracks. As expressed in equation 1B, recall is defined as the ratio of correctly predicted crack pixels with respect to all the true crack pixels. As expressed in equation 1C, F1 score is the harmonic mean of Precision and Recall, which provides a comprehensive measure on the classification performance on a class-imbalanced dataset.

$$Precision = \frac{TP}{TP+FP} \quad (1A)$$

$$Recall = \frac{TP}{TP+FN} \quad (1B)$$

$$F1 = \frac{2 \cdot Precision \cdot Recall}{Precision + Recall} \quad (1C)$$

where TP (true positive) is the number of correctly predicted crack pixels; FP (false positive) is the number of non-crack pixels that are incorrectly predicted as crack pixels; FN (false negative) is the number of true crack pixels misidentified as non-crack pixels.

2.3.2 Intersection Over Union

Intersection over union (IOU), also known as the Jaccard index, is also commonly used for performance evaluation in the field of image segmentation. The expression of IOU is formulated in equation 2, in which the definition of TP, FP, and TN is the same as in equations 1A-1C. IOU reflects the degree of overlap between two objects. The IOU may be evaluated on the "crack" class to provide a measure on the overlap between the ground truth crack object and predicted crack object.

$$IOU = \frac{TP}{TP+FP+FN} \quad (2)$$

2.3.3 Boundry F1 Score

Other than F1 and IOU, another metric called boundary F1 (BF) score is also used. As implied by the name, the BF score is the F1 score extended to semantic segmentation, which quantitatively measures the similarity between the boundary (i.e., a contour) of the ground truth object and that of the predicted object. The BF score varies from 0 to 1, where the value 1 indicates an exact match between the contours of two objects. The BF score may be calculated on the "crack" class to offer an additional measure on the similarity between the ground truth of crack and the predicted crack object.

3. Proposed Methodology

In this section, first, multiple encoder-decoder networks are proposed for crack segmentation, which are described in section 3.1.1; then, the crack segmentation framework is explained in section 3.2.

3.1.1 Proposed DCNNs

A set of encoder-decoder networks with varying network depths and residual connections are proposed. In section 3.1.1, six encoder-decoder networks, denoted as Net-1 through 6, with gradually increased network depths, are proposed for crack segmentation. The number of residual connections in these proposed encoder-decoder networks increases from 1 to 6, correspondingly. To isolate the influences from increasing network depth and from adding residual connections, an additional series of six "plain" counterparts (i.e., without residual connections) of Net-1 through 6 are constructed for comparison, as described in section 3.1.2.

3.1.1. Encoder-Decoder Networks with Residual Connections

Figure 2:
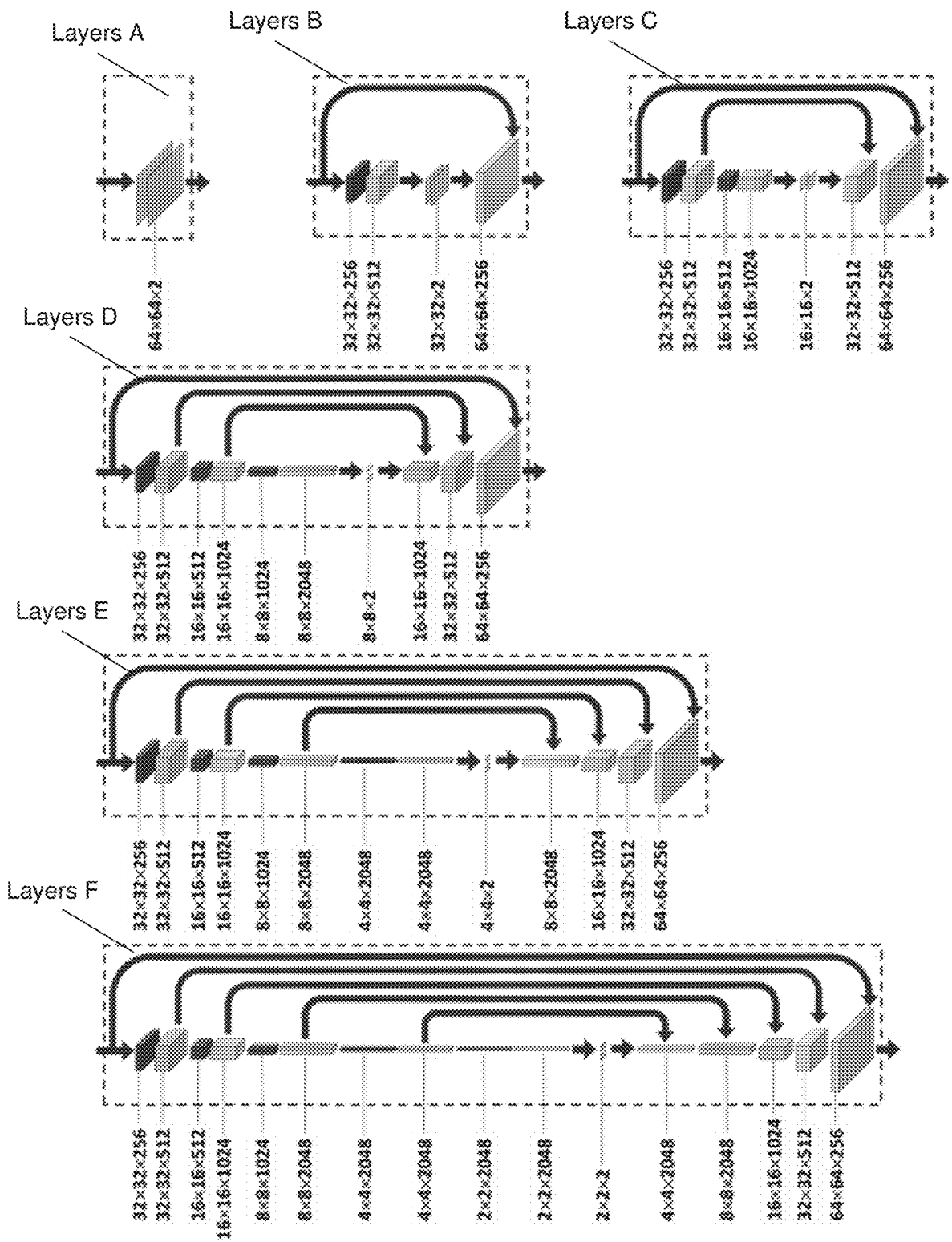
FIG. 2 is an illustration of hidden layers of the proposed architecture.

Referring to FIG. 1, six encoder-decoder networks with residual connections, referred to as Net-1 through Net-6 are proposed. FIG. 1 displays a basic layout 100 that shows an example image 101 to be processed, output 103 (i.e., the output 103A and 103B) that represents the output of a max pooling layer, output 105 (i.e., the output 105A and 105B) that represents the output of a 3×3 convolutional layer, output 107 (i.e., the output 107A and 107B) that represents the output of a batch normalization layer, and output 109 that represents the output of a 1×1 convolutional layer. The layout 100 further includes the dashed box 150 that represents architecture-specific layers which are further illustrated in FIG. 2. Referring to FIG. 2, the layers A corresponds to Net-1, the layers B corresponds to Net-2, the layers C corresponds to Net-3, the layers D corresponds to Net-4, the layers E corresponds to Net-5, and the layers F corresponds to Net-6.

As shown in these two figures, the encoder consists of multiple convolutional blocks for feature extraction. Each convolutional block consists of a 2×2 max pooling layer with a stride of 2 for down-sampling, a 3×3 convolutional layer which adopts 3×3 kernels with a stride of 1 and padding of 1 for feature extraction, a batch normalization layer to improve model generalization, and a leaky rectified linear unit (leaky ReLU) layer to add nonlinearity. For each transposed convolutional block in the decoder, a 3×3 transposed convolutional layer utilizing 3×3 kernels with a stride of 2 and cropping of 1 is adopted for up-sampling, followed by a batch normalization and leaky ReLU layer. The 1×1 convolutional layer performs cross-channel pooling to produce an output map of a desired depth. The softmax layer placed at the end produces a probability map for each input image. The output dimension is shown along with each layer. In each architecture displayed in FIG. 1 combined with FIG. 2, low-level features extracted from the encoder are added to high-level features generated by the decoder through residual connections. These six architectures (Net-1 through Net-6) have different model complexities, represented by the increased network depths and associated number of parameters as shown in Table 1.

TABLE 1

Detailed configurations of the proposed architectures.

| Index | Net name | Network depth* | Residual connection | Number of residual connections | Number of parameters (×10⁶) |
|---|---|---|---|---|---|
| 1 | Net-1 | 6 | √ | 1 | 0.45 |
| 2 | Net-2 | 8 | √ | 2 | 1.93 |
| 3 | Net-3 | 10 | √ | 3 | 7.84 |
| 4 | Net-4 | 12 | √ | 4 | 31.45 |
| 5 | Net-5 | 14 | √ | 5 | 88.10 |
| 6 | Net-6 | 16 | √ | 6 | 163.61 |
| 7 | Net-1A | 6 | x | N/A | 0.45 |
| 8 | Net-2A | 8 | x | N/A | 1.93 |
| 9 | Net-3A | 10 | x | N/A | 7.84 |
| 10 | Net-4A | 12 | x | N/A | 31.45 |
| 11 | Net-5A | 14 | x | N/A | 88.10 |
| 12 | Net-6A | 16 | x | N/A | 163.61 |

*total number of the convolutional and transposed convolutional layers.

3.1.2. Encoder-Decoder Networks without Residual Connections

Figure 3:
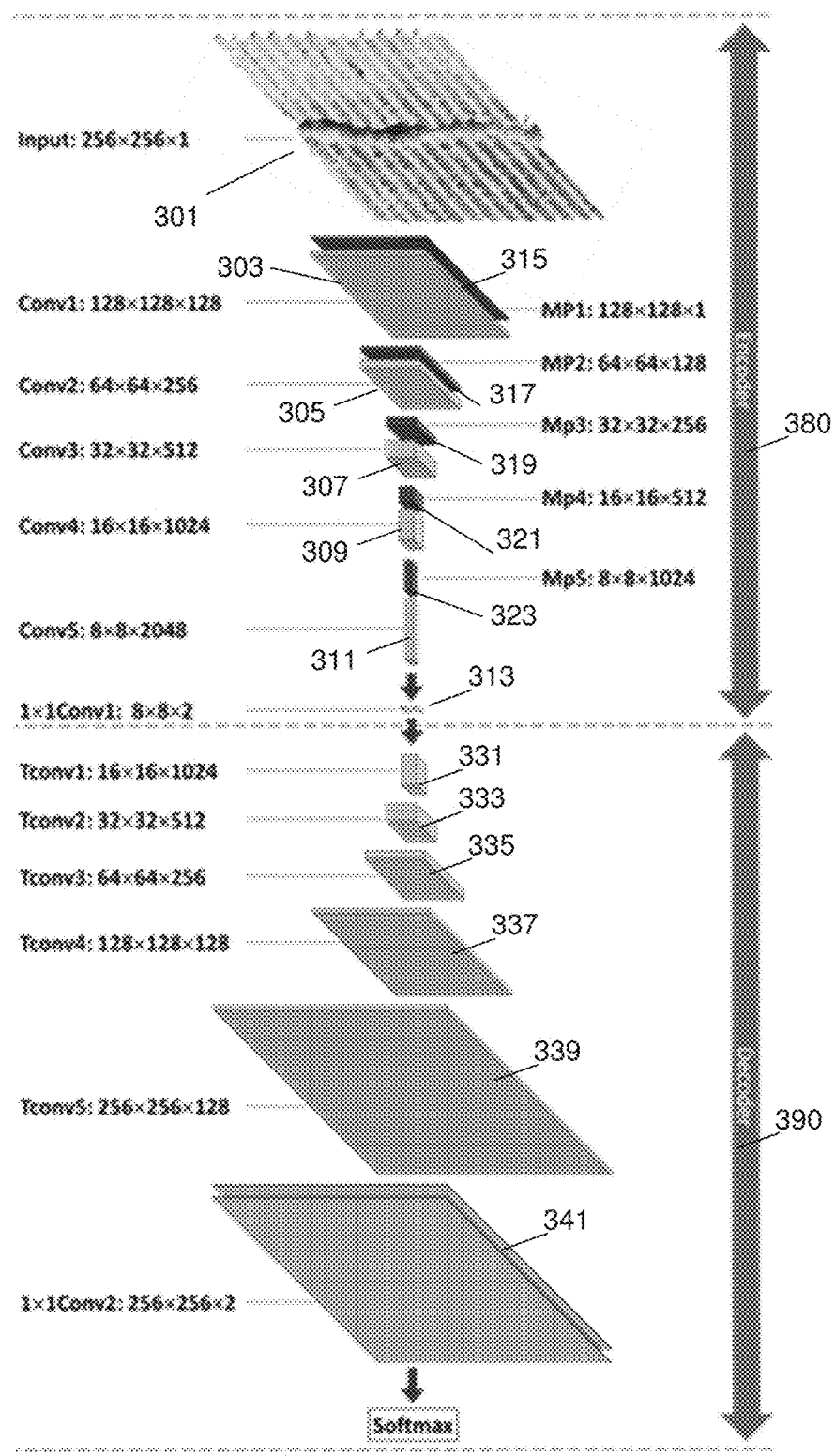
FIG. 3 is an illustration of a counterpart of Net-4.

In addition to Net-1 through Net-6, another six architectures denoted as Net-1A through 6A are constructed as their "plain" counterparts (see Table 1), which have the same layer configurations except they do not contain any residual connections. Thus, through a comparison between each network and its "plain" counterpart, the effect from residual connections on crack segmentation performance can be demonstrated. FIG. 3 is an illustration of the architecture of Net-4A. As shown, Net-4A includes an encoder portion 380 and a decoder portion 390. The encoder portion 380 includes the Input layer 301, the Conv1 layer 303, the Conv2 layer 305, the Conv3 layer 307, the Conv4 layer 309, the Conv5 layer 311, the 1×1Conv1 layer 313, the Mp1 layer 315, the Mpg layer 317, the Mp3 layer 319, the Mp4 layer 321, and the Mp5 layer 323. The decoder portion 390 includes the Tconv1 layer 331, the Tconv2 layer 333, the Tconv3 layer 335, the Tconv4 layer 437, the Tconv5 layer 339, and the 1×1Conv1 layer 341 The detailed layer configuration for Net-4A is tabulated in Table 2.

TABLE 2

Detailed layer configuration of Net-4A.

| Layer name | Layer type | Output dimension | Kernel size | Depth | Stride | Padding* | Cropping* | Learnable parameters | | | |
|---|---|---|---|---|---|---|---|---|---|---|---|
| Input | — | 256 × 256 × 1 | — | — | — | — | — | — | | | |
| MP1 | max pooling | 128 × 128 × 1 | 2 × 2 | — | 2 | 0 | — | — | | | |
| Conv1 | convolution | 128 × 128 × 128 | 3 × 3 × 1 | 128 | 1 | 1 | — | weight | 3 × 3 × 1 × 128 | bias | 1 × 128 |
| BN1 | batch normalization | 128 × 128 × 128 | — | — | — | — | — | scale | 1 × 128 | shift | 1 × 128 |
| LReLU1 | leaky ReLU activation | 128 × 128 × 128 | — | — | — | — | — | | | | |
| MP2 | max pooling | 64 × 64 × 128 | 2 × 2 | — | 2 | 0 | — | — | | | |
| Conv2 | convolution | 64 × 64 × 256 | 3 × 3 × 128 | 256 | 1 | 1 | — | weight | 3 × 3 × 128 × 256 | bias | 1 × 256 |
| BN2 | batch normalization | 64 × 64 × 256 | — | — | — | — | — | scale | 1 × 256 | shift | 1 × 256 |
| LReLU2 | leaky ReLU activation | 64 × 64 × 256 | — | — | — | — | — | | | | |
| MP3 | max pooling | 32 × 32 × 256 | 2 × 2 | — | 2 | 0 | — | — | | | |
| Conv3 | convolution | 32 × 32 × 512 | 3 × 3 × 256 | 512 | 1 | 1 | — | weight | 3 × 3 × 256 × 512 | bias | 1 × 512 |
| BN3 | batch normalization | 32 × 32 × 512 | — | — | — | — | — | scale | 1 × 512 | shift | 1 × 512 |
| LReLU3 | leaky ReLU activation | 32 × 32 × 512 | — | — | — | — | — | | | | |
| MP4 | max pooling | 16 × 16 × 512 | 2 × 2 | — | 2 | 0 | — | — | | | |
| Conv4 | convolution | 16 × 16 × 1024 | 3 × 3 × 512 | 1024 | 1 | 1 | — | weight | 3 × 3 × 512 × 1024 | bias | 1 × 1024 |
| BN4 | batch normalization | 16 × 16 × 1024 | — | — | — | — | — | scale | 1 × 1024 | shift | 1 × 1024 |
| LReLU4 | leaky ReLU activation | 16 × 16 × 1024 | — | — | — | — | — | | | | |
| MP5 | max pooling | 8 × 8 × 1024 | 2 × 2 | — | 2 | 0 | — | — | | | |
| Conv5 | convolution | 8 × 8 × 2048 | 3 × 3 × 1024 | 2048 | 1 | 1 | — | weight | 3 × 3 × 1024 × 2048 | bias | 1 × 2048 |
| BN5 | batch normalization | 8 × 8 × 2048 | — | — | — | — | — | scale | 1 × 2048 | shift | 1 × 2048 |
| LReLU5 | leaky ReLU activation | 8 × 8 × 2048 | — | — | — | — | — | | | | |
| 1 × 1Conv1 | convolution | 8 × 8 × 2 | 1 × 1 × 2048 | 2 | 1 | 0 | — | weight | 1 × 1 × 2048 × 2 | bias | 1 × 2 |
| TConv1 | transposed convolution | 16 × 16 × 1024 | 3 × 3 × 2 | 1024 | 2 | — | 1 | weight | 3 × 3 × 2 × 1024 | bias | 1 × 1024 |
| BN6 | batch normalization | 16 × 16 × 1024 | — | — | — | — | — | scale | 1 × 1024 | shift | 1 × 1024 |
| LReLU6 | leaky ReLU activation | 16 × 16 × 1024 | — | — | — | — | — | | | | |
| TConv2 | transposed convolution | 32 × 32 × 512 | 3 × 3 × 1024 | 512 | 2 | — | 1 | weight | 3 × 3 × 1024 × 512 | bias | 1 × 512 |
| BN7 | batch normalization | 32 × 32 × 512 | — | — | — | — | — | scale | 1 × 512 | shift | 1 × 512 |
| LReLU7 | leaky ReLU activation | 32 × 32 × 512 | — | — | — | — | — | | | | |
| TConv3 | transposed convolution | 64 × 64 × 256 | 3 × 3 × 512 | 256 | 2 | — | 1 | weight | 3 × 3 × 512 × 256 | bias | 1 × 256 |
| BN8 | batch normalization | 64 × 64 × 256 | — | — | — | — | — | scale | 1 × 256 | shift | 1 × 256 |
| LReLU8 | leaky ReLU activation | 64 × 64 × 256 | — | — | — | — | — | | | | |
| TConv4 | transposed convolution | 128 × 128 × 128 | 3 × 3 × 256 | 128 | 2 | — | 1 | weight | 3 × 3 × 256 × 128 | bias | 1 × 128 |
| BN9 | batch normalization | 128 × 128 × 128 | — | — | — | — | — | scale | 1 × 128 | shift | 1 × 128 |
| LReLU9 | leaky ReLU activation | 128 × 128 × 128 | — | — | — | — | — | | | | |
| TConv5 | transposed convolution | 256 × 256 × 128 | 3 × 3 × 128 | 128 | 2 | — | 1 | weight | 3 × 3 × 128 × 128 | bias | 1 × 128 |
| BN10 | batch normalization | 256 × 256 × 128 | — | — | — | — | — | scale | 1 × 128 | shift | 1 × 128 |
| LReLU10 | leaky ReLU activation | 256 × 256 × 128 | — | — | — | — | — | | | | |
| 1 × 1Conv2 | convolution | 256 × 256 × 2 | 1 × 1 × 128 | 2 | 1 | 0 | — | weight | 1 × 1 × 128 × 2 | bias | 1 × 2 |
| Softmax | softmax normalization | 256 × 256 × 2 | — | — | — | — | — | | | | |
| | | | | | | | | Sum | 31450116 | | |

3.2. DCNN-Based Crack Segmentation Framework

Figure 4:
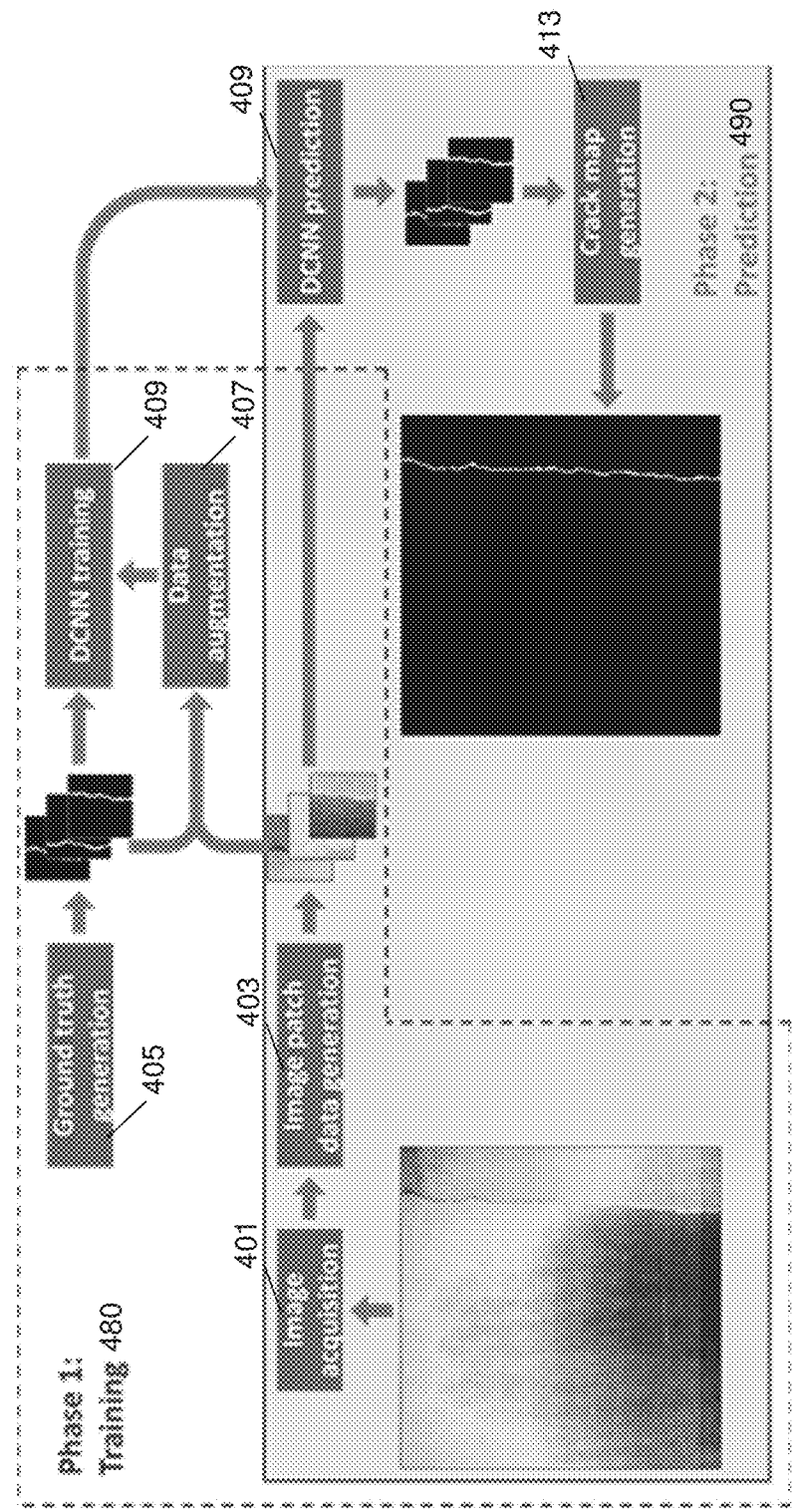
FIG. 4 is an illustration of a proposed crack segmentation framework.

FIG. 4 illustrates the roadway crack segmentation framework which is comprised of two phases: i) a DCNN training phase 480; and ii) a DCNN prediction phase 490. The phases 480 and 490 may be performed together or separately by one or more computing devices such as the computing device 800 illustrated with respect to FIG. 8.

For the DCNN training phase 480, first, roadway images are acquired at 401; then, image patches with a dimension of 256×256 pixels are produced through a sliding window process at 403; ground truth labels are generated for the image patches containing cracks at 405; finally, the cracked image patches with their ground truth labels are augmented at 407 and then utilized for DCNN training at 409.

Once the DCNN is trained, it can be used in the second phase, which is the DCNN prediction phase 490. During the prediction phase 490, new image data is acquired from roadway surfaces at 401, and cropped into patches using a sliding window process at 403; then, crack maps with pixel-wise resolution are generated by the DCNN for the image patches at 409. Finally, through an inverse operation of the sliding window process, a crack map for the roadway image is reconstructed at 413.

4. Experimental Study

Section 4.1 and 4.2 first introduce the data preparation process including data acquisition and generation, respectively; then, information on the experimental setup including the computing environment, parameter initialization, and hyperparameter setting is described in section 4.3; finally, in section 4.4, the experimental results and associated discussions are summarized.

4.1. Data Acquisition

A laser imaging system, manufactured by AMES Engineering, may be adopted to acquire laser-scanned range images from roadway surfaces. Integrated into a survey vehicle, this laser imaging system consists of three components: a three-dimensional (3D) laser camera, a data acquisition module (DAQ), and an on-board data processing computer. The 3D camera is mounted on the rear of the vehicle; the vertical distance between the camera module and the ground is 2.13 m (84 inch), such that the camera can capture a 3.96 m (156 inch) wide transverse profile of the roadway surface during each scan; the scanned profile contains 4096 pixels, making the transverse pixel resolution as close to 1 mm/pixel (0.04 inch/pixel). The depth resolution of the 3D camera is 0.1 mm. The pixel resolution along the longitudinal direction is related with the vehicle speed. In this study, the system captures 4856 transverse profiles per second. Thus, with a driving speed up to 9.83 m/s (22 mph), the longitudinal pixel resolution of the acquired range image can reach 2 mm/pixel (0.08 inch/pixel). Note that the described imaging system is for illustrative purposes only. Other imaging systems may be used.

4.2. Data Generation

Figure 5:
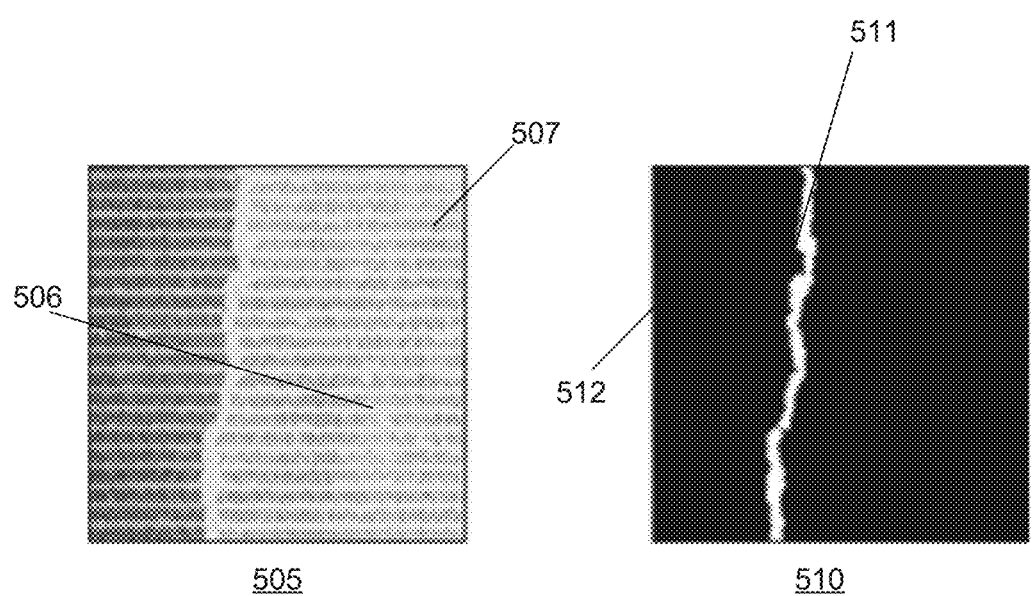
FIG. 5 is an illustration of two exemplary crack image patches.

The image range data may be collected through a long-term (over one year) effort on multiple concrete roadways with highly complex surface conditions. In total, over 1200 image frames (dimension: 4096×2048 pixels) were initially captured. Subsequently, each image frame is cropped into patches (dimension: 256×256 pixels) through a sliding window process. As a result, over 4000 image patches containing cracks are selected by trained personnel as the data samples. Meanwhile, the ground truth pixel label map for each image patch is generated through a manual labeling process, and further carefully inspected by trained personnel for quality control. FIG. 5 illustrates an example of the generated image data. Patch 505 shows a raw range image patch contaminated with surface variations 506 and grooved patterns 507; and, Patch 510 illustrates the corresponding ground truth pixel label, where the white pixels 511 are cracks and black ones are non-crack pixels 512.

Data augmentation is an effective strategy to improve generalization and reduce model overfit by increasing the number of image samples through label-preserving transformations. Data augmentation techniques including rotation (90°, 180°, and 270° counter-clockwise) and mirroring (top-bottom and left-right) are adopted to augment the obtained image patches and the associated ground truth.

Table 3 shows the configuration of the acquired datasets, where the image patches are separated into the training, validation, and test datasets following a ratio of 60%:20%:20%. The training dataset is utilized to fit the DCNN model. The validation dataset is evaluated every a few iterations during training to provide a measure on the model fit and indicate whether overfitting occurs. After training, the trained model makes predictions on the test dataset. The metrics on the test dataset provide a cross-comparison between different DCNN models on their segmentation performance.

TABLE 3

Detailed configuration on the image datasets.

| Data type | Image dimension (pixel) | Number of samples | | |
|---|---|---|---|---|
| | | Training | Validation | Test |
| range image | 256 × 256 | 15016 | 5005 | 5005 |

4.3. Experimental Setup

4.3.1. Computing Hardware and Software

The specifications of the data processing computer are as follows: CPU is Intel i7-8750H and GPU is Nvidia GTX 1060 with 6 GB RAM. The proposed methodology is implemented in MATLAB R2019a with its deep learning toolbox. Other hardware and software configurations may be used.

4.3.2. Initialization of the Learnable Parameters

The weights in the convolutional layers and transposed convolutional layers are initialized by the Glorot initializer, which independently samples each weight from a Gaussian distribution with zero mean and a variance based on the dimension of the weights. The biases in the convolutional layers and transposed convolutional layers are initialized as zero. Regarding the scale and shift factors in each batch normalization layer, their initial values are set as one and zero, respectively.

4.3.3. Hyperparameter Setting

The mini-batch stochastic gradient-descent (SGD) with momentum algorithm is adopted as the optimization algorithm for training. The details of this optimization technique are not described herein for conciseness. The associated hyperparameters include the weight decay factor, momentum, learning rate, mini-batch size, and number of epochs. It is noted that, upon training different architectures, the same hyperparameter values are adopted to provide a basis for comparison. The hyperparameter values are as follows: weight decay factor=0.0003; momentum=0.9; initial learning rate=0.01; learning rate drop factor=0.8; mini-batch size=10; number of epochs=10.

4.4. Results and Discussions

Two experimental cases are performed. Case I is designed to investigate the influences of different network depths and residual connections on crack segmentation performance.

From Case I, an optimal architecture among the twelve proposed DCNNs that yields the highest performance measures is selected. Then, in Case II, the performance of the optimal architecture is further demonstrated on three roadway images.

4.4.1. Case I: Comparison on the Segmentation Performance

As introduced in section 3.1.1, six encoder-decoder networks denoted as Net-1 through 6 with gradually increased network depths are proposed; from Net-1 through 6, the number of residual connections is also increased from 1 to 6, as listed in Table 1 and illustrated in FIG. 1 and FIG. 2. Besides, to isolate the impacts from increasing the network depth and from adding residual connections, another six architectures denoted as Net-1A through 6A are also designed as "plain" counterparts; these variants have the same layer configurations as their originals except they do not employ any residual connection.

CrackNet II, a DCNN developed for roadway crack segmentation with range images, is adopted in Case I for comparison. Thus, in total, thirteen architectures are trained and tested on the same datasets under the same hyperparameter configurations. Five metrics including precision, recall, F1, IOU, and BF score are evaluated on the validation dataset and test dataset, respectively, and their mean values are tabulated in Table 4. From the "validation metrics" section in Table 4, it can be seen Net-4 has the highest values in mean F1, IOU, and BF score among all cases, indicating the best model fit. Net-4 also yields the highest values in the mean F1, IOU, and BF score calculated on the test dataset.

Table 4. Generally, from Net-1 through Net-5, as the network becomes deeper, the training time has little variation; however, in Net-6, the time cost for training is drastically increased by over 70%, indicating a deteriorated training efficiency. The same trend can be observed among Net-1A through 6A as well. Also, using residual connections yields very marginal influence on the training time. Regarding the testing efficiency, the deeper architectures require a longer time for testing; for example, the testing time is increased by 70% from Net-1A to 6A. Meanwhile, as can be observed, using residual connections leads to up to 12% variations in the testing time, and its impact on the testing efficiency is not consistent. Additionally, the architecture Net-4 is more efficient than CrackNet II in that Net-4 only consumes 44% and 55% of the time cost for training and testing, respectively, by CrackNet II.

4.4.2 Case II: Performance Demonstration on Concrete Roadway Images

Net-4 was also tested on three roadway surface images. Three metrics including F1, IOU, and BF score are employed to provide a quantitative measure on the segmentation performance on each image surface, as listed in Table 5. The F1, IOU, and BF score values on all three images are above 80%, 70%, and 90%, respectively, indicating very high segmentation performance by Net-4. Thus, it is demonstrated the proposed methodology can achieve accurate and robust crack segmentation performance on laser-scanned roadway range images, in which the cracks are contaminated by surface variations and grooved patterns.

TABLE 4

Case I: performance metrics.

| Index | Net name | Validation metrics (mean percentage values) | | | | | Testing metrics (mean percentage values) | | | | | Time | |
|---|---|---|---|---|---|---|---|---|---|---|---|---|---|
| | | Precision | Recall | F1 | IOU | BF score | Precision | Recall | F1 | IOU | BF score | Training (mm) | Testing (sec) |
| 1 | Net-1 | 88.9 | 57.4 | 67.2 | 52.8 | 75.8 | 88.7 | 57.2 | 67.0 | 52.6 | 75.6 | 817.5 | 105.9 |
| 2 | Net-2 | 88.9 | 81.8 | 84.2 | 73.8 | 89.7 | 88.9 | 81.7 | 84.1 | 73.7 | 89.6 | 872.0 | 111.5 |
| 3 | Net-3 | 88.8 | 85.9 | 86.7 | 77.2 | 92.1 | 88.9 | 85.9 | 86.7 | 77.2 | 92.2 | 818.0 | 122.3 |
| 4 | Net-4 | 90.1 | 85.4 | 87.2 | 77.9 | 92.8 | 90.1 | 85.5 | 87.3 | 78.0 | 92.9 | 934.9 | 134.5 |
| 5 | Net-5 | 89.9 | 85.1 | 87.0 | 77.5 | 92.6 | 89.8 | 85.1 | 86.9 | 77.4 | 92.7 | 947.6 | 162.3 |
| 6 | Net-6 | 88.7 | 86.5 | 87.1 | 77.7 | 92.7 | 88.7 | 86.5 | 87.1 | 77.7 | 92.8 | 1473.7 | 162.1 |
| 7 | Net-1A | 86.1 | 59.8 | 66.9 | 53.0 | 74.9 | 85.9 | 59.8 | 66.8 | 52.8 | 74.6 | 833.2 | 105.5 |
| 8 | Net-2A | 84.5 | 74.5 | 78.1 | 65.2 | 87.7 | 84.6 | 74.3 | 78.0 | 65.1 | 87.6 | 850.2 | 108.1 |
| 9 | Net-3A | 78.5 | 71.6 | 74.0 | 59.7 | 85.6 | 78.7 | 71.5 | 73.9 | 59.7 | 85.5 | 858.4 | 136.2 |
| 10 | Net-4A | 72.2 | 60.7 | 65.1 | 49.6 | 78.1 | 72.4 | 60.7 | 65.2 | 49.7 | 78.0 | 908.2 | 149.6 |
| 11 | Net-5A | 58.3 | 47.3 | 50.5 | 35.6 | 62.1 | 58.6 | 47.5 | 50.8 | 35.9 | 62.2 | 940.5 | 155.0 |
| 12 | Net-6A | 52.1 | 16.3 | 21.9 | 13.5 | 33.0 | 52.2 | 16.7 | 22.4 | 13.8 | 33.5 | 1521.6 | 180.1 |
| 13 | CrackNet II | 91.5 | 42.8 | 54.5 | 40.6 | 64.1 | 91.5 | 42.3 | 53.9 | 40.1 | 63.6 | 2127.2 | 244.8 |

Testing was also performed on eight crack images which are contaminated with surface variations and grooves a to demonstrate the segmentation performance by different networks. It was observed that Net-1, Net-1A, and CrackNet II yielded some false positive detections by misidentifying the grooves as cracks. By increasing the network depth, such a misidentification issue vanishes for the proposed DCNNs. Again, it was shown that Net-4 yielded the highest segmentation performance on these image samples. It was shown that the networks with residual connections (Net-2 through 6) yielded higher metrics values on almost all eight samples than their "plain" counterparts. Net-2 through Net-6 also yielded very consistent crack segmentation performance under the disturbance of grooves.

Regarding the efficiency of the proposed architectures, the training and testing time are listed in

TABLE 5

Case II: performance metrics.

| Image name | Data type | Performance metrics (%) | | |
|---|---|---|---|---|
| | | F1 | IOU | BF score |
| Surface 1 | range image | 87.1 | 77.1 | 98.5 |
| Surface 2 | range image | 84.8 | 73.6 | 96.9 |
| Surface 3 | range image | 83.6 | 71.9 | 92.4 |

Figure 6:
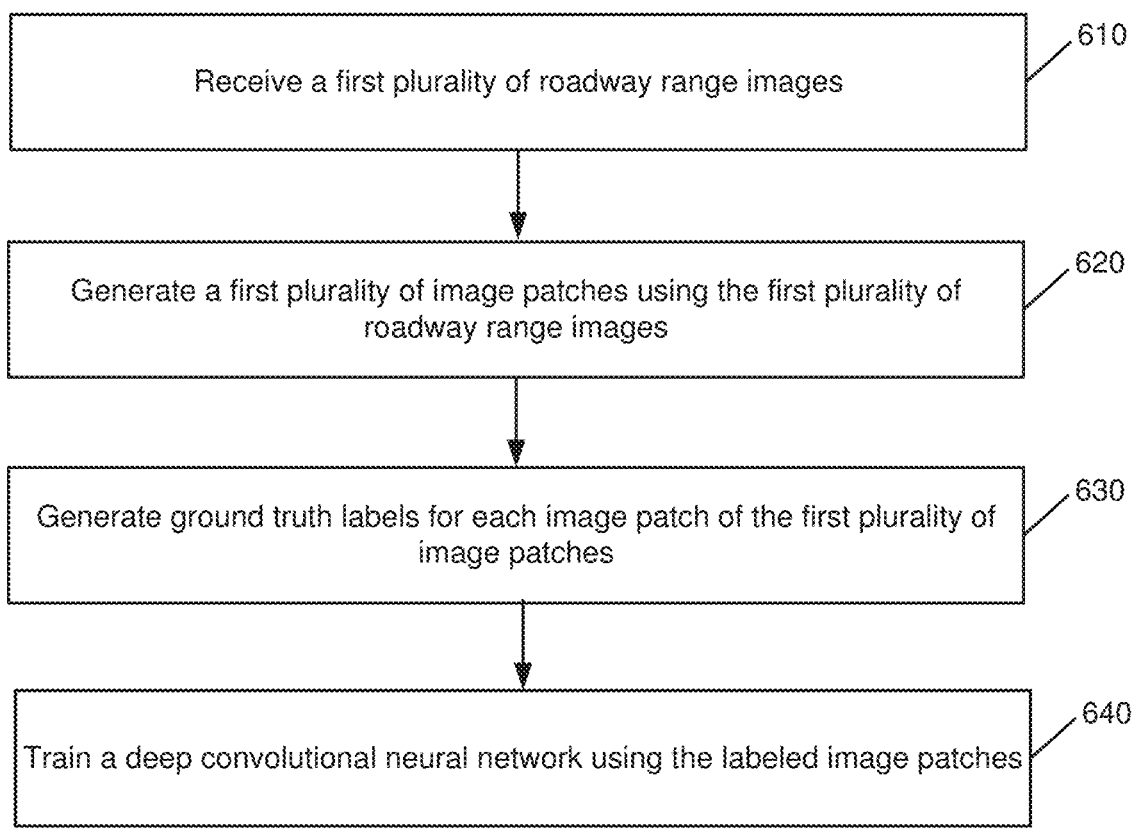
FIG. 6 is an operational flow of an implementation of a method training a DCNN to perform pixel level roadway crack segmentation.

FIG. 6 is an operational flow of an implementation of a method 600 for training a DCNN to perform pixel level roadway crack segmentation. The method 600 may be implemented by an imaging system. The imaging system may include a computing device such as the computing system 800 illustrated with respect to FIG. 8.

At 610, a first plurality of roadway images is received. The first plurality of roadway images may be received by the imaging system. The first plurality of roadway images may be training images and may include images that are known to be associated with road segments that have cracks and road segments that do not have cracks. Any method for collecting training images may be used. The images may be 3D images. Alternatively, the images may be collected and received from a third-party image collector.

At 620, a first plurality of image patches is generated using the first plurality of roadway images. The first plurality of image patches may be generated from each of the roadway images using a sliding window process. Depending on the embodiment, each image patch may have a pixel dimension of approximately 256×256. Other dimensions may be used.

At 630, ground truth labels are generated for each image patch of the first plurality of image patches. The ground truth labels may be generated manually. The ground truth labels may indicate whether or not each associated image patch includes a crack or does not include a crack.

At 640, a deep convolutional neural network is trained using the labeled image patches. The DCNN may be trained by the computing system 800. Depending on the embodiment, the DCNN may or may not have residual connections. The DCNN may be the Net-4 embodiment described above.

Figure 7:
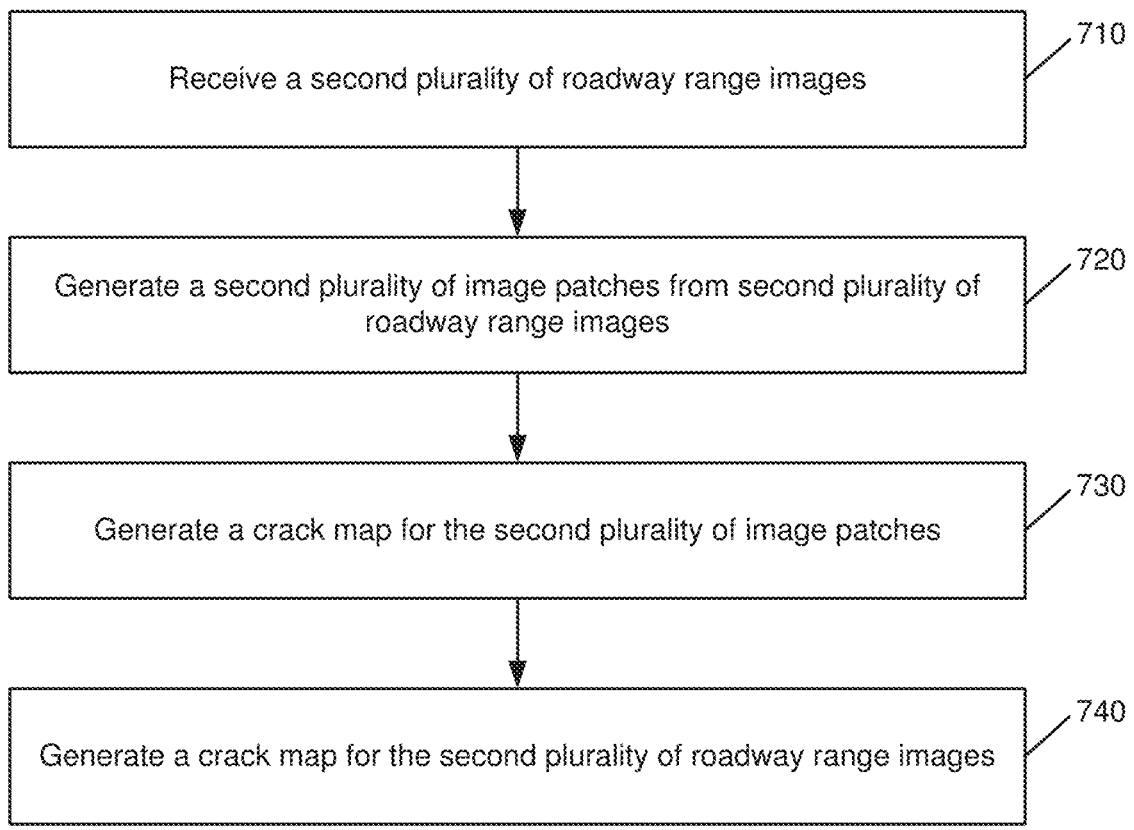
FIG. 7 is an operational flow of an implementation of a method for pixel level roadway crack segmentation.

FIG. 7 is an operational flow of an implementation of a method 700 for performing pixel level roadway crack segmentation using a trained DCNN. The method 700 may be implemented by an imaging system. The imaging system may include a computing device such as the computing system 800 illustrated with respect to FIG. 8.

At 710, a second plurality of roadway images is received. The second plurality of roadway images may be received by the imaging system. The second plurality of roadway images may be different than the first plurality of roadway images that were used to train the DCNN. The second plurality of roadway images may be captured by a laser imaging system or an image capturing system that is attached to a vehicle, for example. The second plurality of roadway images may be captured by the vehicle as the vehicle travels on the roadway.

At 720, a second plurality of image patches is generated. The second plurality of image patches may be generated from the second plurality of roadway images by the computing system 800. The image patches may be generated using a sliding window process. Depending on the embodiment, each image patch may be associated with a location of the roadway image that the image patch was generated from. The location may be an identifier of a road segment or other geographic location. The locations may have been captured by a GPS or other location determination device associated with the vehicle.

At 730, a crack map for the second plurality of image patches is generated. The crack map may be generated by computing system 800 using the DCNN. In some implementations, the crack map may be generated by feeding each of the image patches of the second plurality of image patches into the DCNN to determine if it is associated with a crack. As a pixel level crack classification tool, if the DCNN determines a pixel of an image patch is associated with a crack, that pixel of the image patch is marked on the crack map as being associated with a crack. Other methods may be used.

At 740, a crack map for the second plurality of roadway images is generated. The crack map for the second plurality of roadway images may be generated by the computing system 800 using the inverse operation of the sliding window process and the crack map of the second plurality of image patches. The generated crack map may then be used to identify locations where road repairs may be needed. For example, a repair crew may be dispatched to the locations of the crack map that are identified as being associated with a crack.

Figure 8:
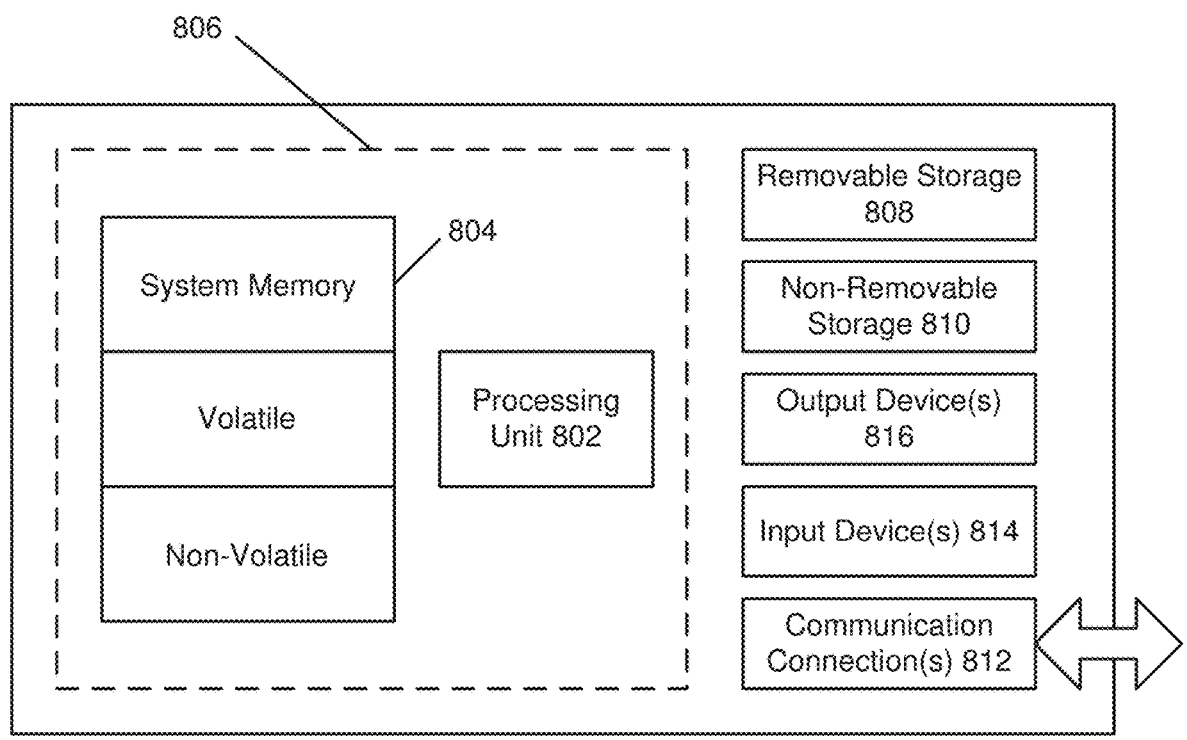
FIG. 8 shows an exemplary computing environment in which example embodiments and aspects may be implemented.

FIG. 8 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by the device 800 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communication connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips, devices, cores, or GPUs. In addition, some parts of the disclosed subject matter may be implemented in parallel or sequentially by the plurality of processing chips, devices, cores, or GPUs. Such devices might include personal computers, network servers, cameras, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for pixel level roadway crack segmentation comprising:
receiving a first plurality of 3D roadway range images by an imaging system, wherein each 3D roadway range image of the first plurality of 3D roadway range images is laser-scanned perpendicular to a roadway surface;
generating a first plurality of 3D image patches from the first plurality of 3D roadway range images without downsampling by a computing device, wherein each 3D roadway range image is cropped into multiple 3D image patches of the first plurality of 3D image patches;
for each image patch of the first plurality of 3D image patches, generating a ground truth label for the image patch; and
training a deep convolutional neural network ("DCNN") using the labeled 3D image patches by the computing device, wherein the DCNN receives 3D roadway range image patches as inputs, and wherein the DCNN comprises a plurality of 2D convolutional layers and 2D transposed convolutional layers with residual connections between the 2D convolutional layers and the 2D transposed convolutional layers, and wherein some of the plurality of 2D transposed convolutional layers receive one or more features from one or more preceding 2D convolutional layers through the residual connections, and wherein the DCNN produces pixel-level crack maps as outputs, wherein the DCNN is an encoder-decoder network that receives the 3D roadway range image patches as inputs and comprises a decoder module and an encoder module, and wherein the encoder module contains a plurality of convolutional layers in a first order, and wherein the decoder module contains a corresponding plurality of transposed convolutional layers in a second order, and wherein each convolutional layer in the encoder module is connected to a corresponding transposed convolutional layer in the decoder module through a residual connection, and wherein a number of convolutional kernels of each convolutional layer in the encoder module equals two times a number of convolutional kernels of a directly preceding convolutional layer in the first order, and wherein a number of transposed convolutional kernels of each transposed convolutional layer in the decoder module is two times a number of transposed convolutional kernels in a directly following transposed convolutional layer in the second order.

2. The method of claim 1, further comprising:
receiving a second plurality of 3D roadway range images;
generating a second plurality of 3D image patches from the second plurality of 3D roadway range images;
generating a crack map for the second plurality of 3D image patches by the DCNN; and
generating a crack map for the second plurality of 3D roadway range images based on the generated crack map for the second plurality of 3D image patches.

3. The method of claim 1, wherein generating the first plurality of 3D image patches from the first plurality of 3D roadway range images comprises generating the first plurality of 3D images patches without filtering or pre-processing.

4. A system for pixel-level roadway crack segmentation comprising:
a laser imaging system;
at least one computing device; and
instructions that when executed cause the laser imaging system or the at least one computing device to:
receive a first plurality of 3D roadway range images, wherein each 3D roadway range image of the first plurality of 3D roadway range images is laser-scanned perpendicular to a roadway surface;
generate a first plurality of 3D image patches from the first plurality of 3D roadway range images without downsampling, wherein each 3D roadway range image is cropped into multiple 3D image patches of the first plurality of 3D image patches;

for each image patch of the first plurality of 3D image patches, receive a ground truth label for the image patch from a reviewer; and train a deep convolutional neural network ("DCNN") using the labeled 3D images patches, wherein the DCNN receives 3D roadway range image patches as inputs, and wherein the DCNN comprises a plurality of 2D convolutional layers and 2D transposed convolutional layers with residual connections between the 2D convolutional layers and 2D transposed convolutional layers, and wherein some of the plurality of 2D transposed convolutional layers receive one or more features from one or more preceding 2D convolutional layers through the residual connections, and wherein the DCNN produces pixel-level crack maps as outputs, wherein the DCNN is an encoder-decoder network that receives the 3D roadway range image patches as inputs and comprises a decoder module and an encoder module, and wherein the encoder module contains a plurality of convolutional layers in a first order, and wherein the decoder module contains a corresponding plurality of transposed convolutional layers in a second order, and wherein each convolutional layer in the encoder module is connected to a corresponding transposed convolutional layer in the decoder module through a residual connection, and wherein a number of convolutional kernels of each convolutional layer in the encoder module equals two times a number of convolutional kernels of a directly preceding convolutional layer in the first order, and wherein a number of transposed convolutional kernels of each transposed convolutional layer in the decoder module is two times a number of transposed convolutional kernels in a directly following transposed convolutional layer in the second order.

5. The system of claim 4, further comprising instruction that when executed by the at least one computing device cause the at least one computing device to:

receive a second plurality of 3D roadway range images;

generate a second plurality of 3D image patches from the second plurality of 3D roadway range images;

generate a crack map for the second plurality of 3D image patches by the DCNN; and generate a crack map for the second plurality of 3D roadway range images based on the generated crack map for the second plurality of 3D image patches.

6. A method for pixel level roadway crack segmentation comprising:

receiving a plurality of 3D roadway range images, wherein each 3D roadway range image of the plurality of 3D roadway range images is laser-scanned perpendicular to a roadway surface;

generating a plurality of 3D image patches from the plurality of roadway range images without downsampling, wherein each 3D roadway range image is cropped into multiple 3D image patches of the plurality of 3D image patches;

generating a crack map for the plurality of 3D image patches by a DCNN, wherein the DCNN receives 3D roadway range image patches as inputs, and wherein the DCNN comprises a plurality of 2D convolutional layers and 2D transposed convolutional layers with residual connections between the 2D convolutional layers and the 2D transposed convolutional layers, and wherein some of the plurality of convolutional layer receive one or more features from one or more preceding 2D convolutional layers through the residual connections; and generating a crack map for the plurality of roadway range images based on the generated crack map for the plurality of 3D image patches, wherein the DCNN is an encoder-decoder network that receives the 3D roadway range image patches as inputs and comprises a decoder module and an encoder module, and wherein the encoder module contains a plurality of convolutional layers in a first order, and wherein the decoder module contains a corresponding plurality of transposed convolutional layers in a second order, and wherein each convolutional layer in the encoder module is connected to a corresponding transposed convolutional layer in the decoder module through a residual connection, and wherein a number of convolutional kernels of each convolutional layer in the encoder module equals two times a number of convolutional kernels of a directly preceding convolutional layer in the first order, and wherein a number of transposed convolutional kernels of each transposed convolutional layer in the decoder module is two times a number of transposed convolutional kernels in a directly following transposed convolutional layer in the second order.

7. The method of claim 6, wherein the encoder module comprises a plurality of 2D convolutional layers, and wherein each 2D convolutional layer decreases a height and a width of input features of a previous 2D convolutional layer by a factor of 2, and wherein output features of each 2D convolutional layer are processed through a Batch Normalization layer followed by a Leaky Rectified Linear Unit.

8. The method of claim 6, wherein the decoder module comprises a plurality of 2D transposed convolutional layers, and wherein each 2D transposed convolutional layer increases height and width dimensions of input features of a previous 2D transposed convolutional layer by a factor of 2, and wherein output features of each 2D transposed convolutional layer are processed through a Batch Normalization layer followed by a Leaky Rectified Linear Unit.

* * * * *